Jan. 10, 1956      C. G. JOA      2,730,144
AUTOMATIC HOPPER FEED FOR A WOOD WORKING MACHINE
Filed Nov. 4, 1953      4 Sheets-Sheet 1
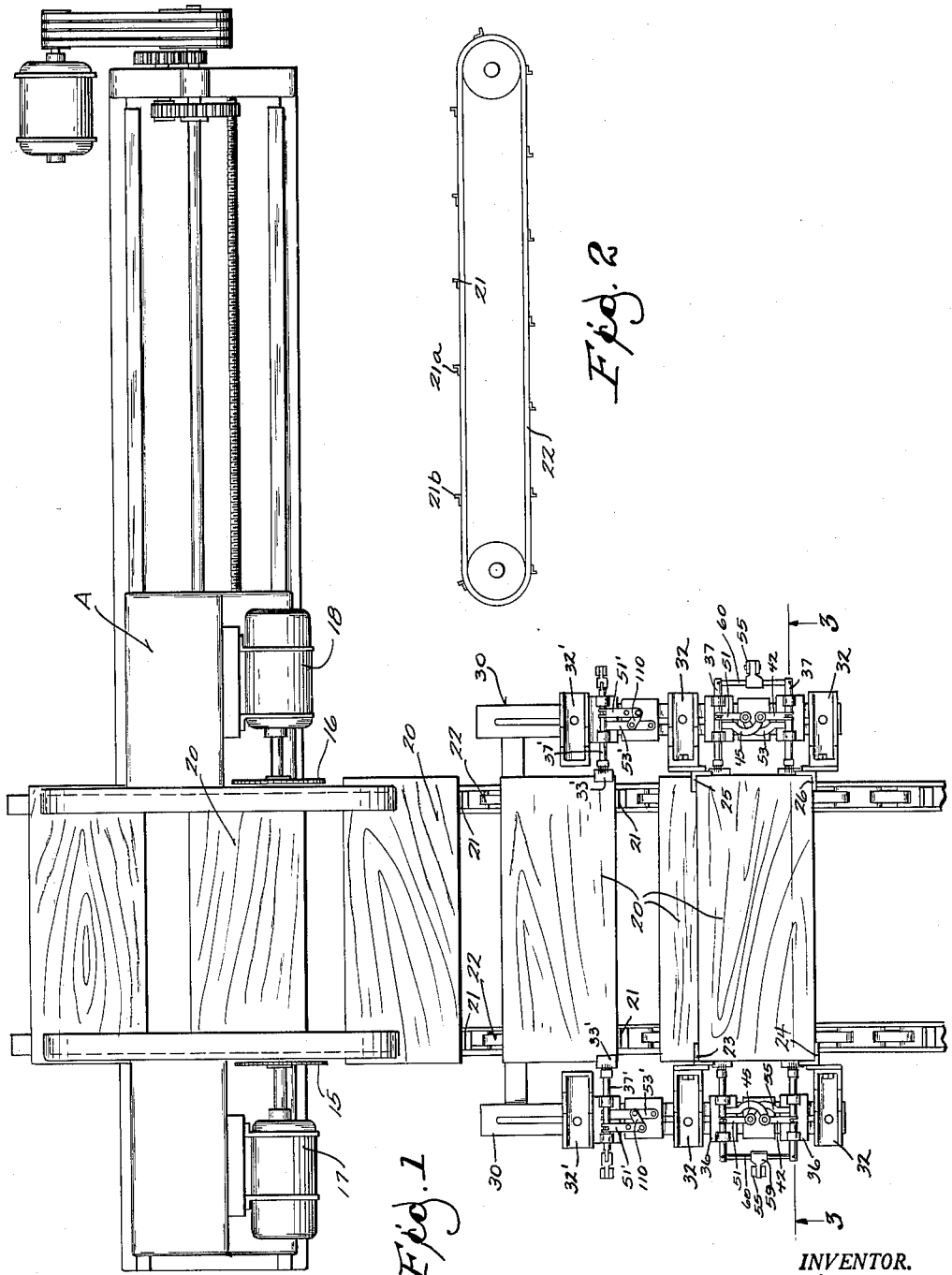
INVENTOR.
CURT G. JOA
BY
Wheeler, Wheeler & Wheeler
ATTORNEYS

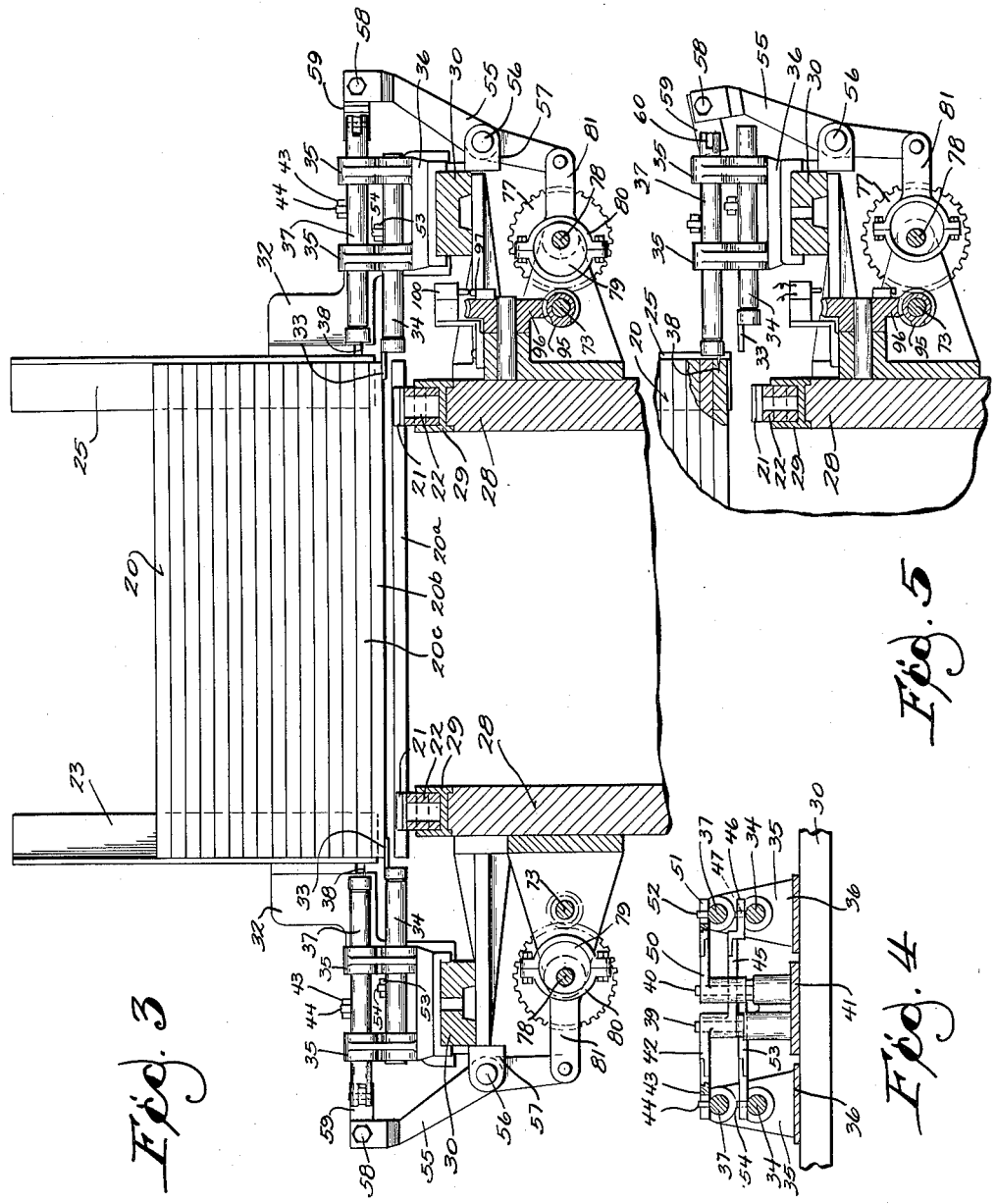

Jan. 10, 1956  C. G. JOA  2,730,144
AUTOMATIC HOPPER FEED FOR A WOOD WORKING MACHINE
Filed Nov. 4, 1953  4 Sheets-Sheet 3
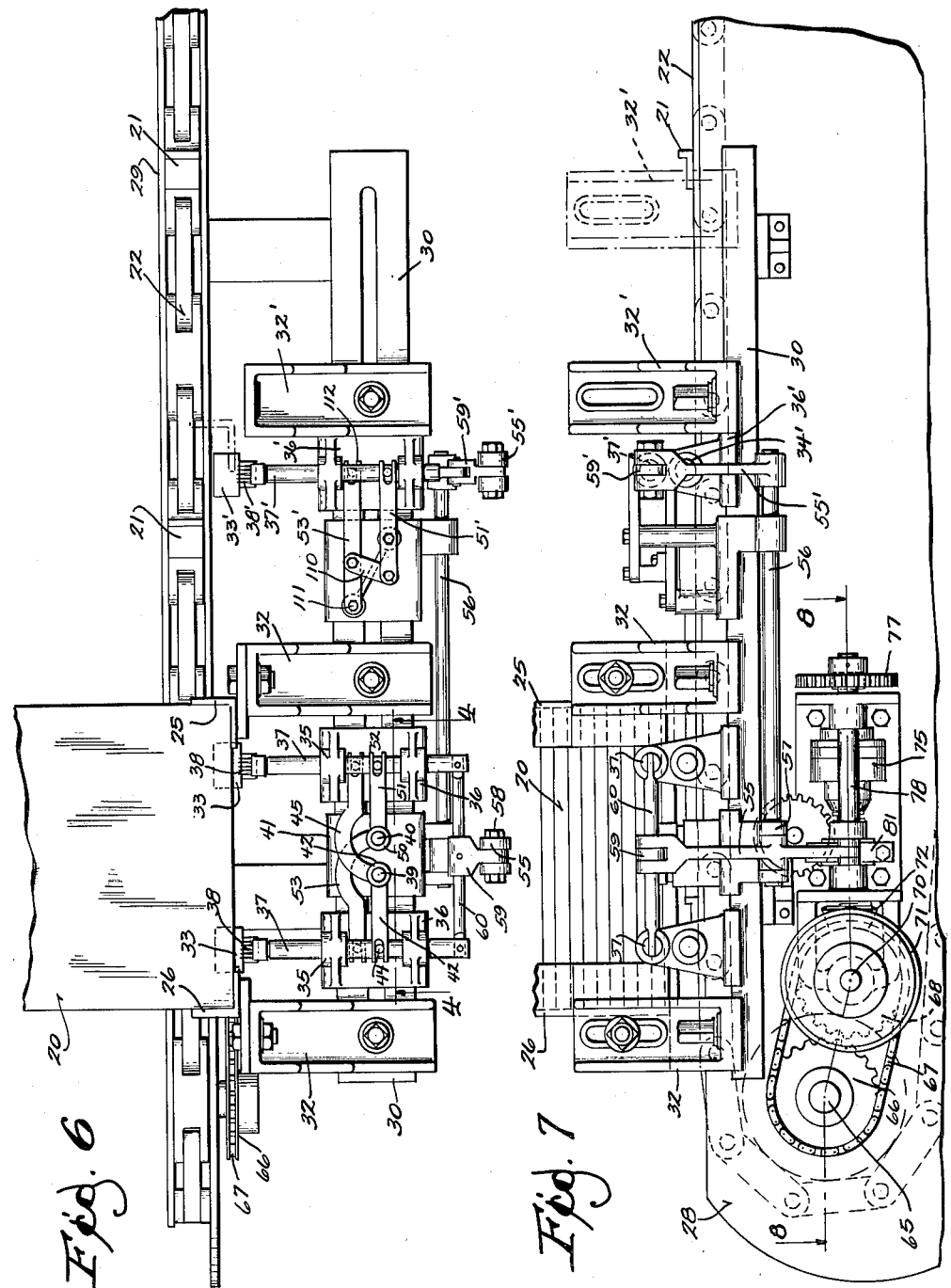
INVENTOR.
CURT G. JOA
BY
Wheeler, Wheeler & Wheeler
ATTORNEYS

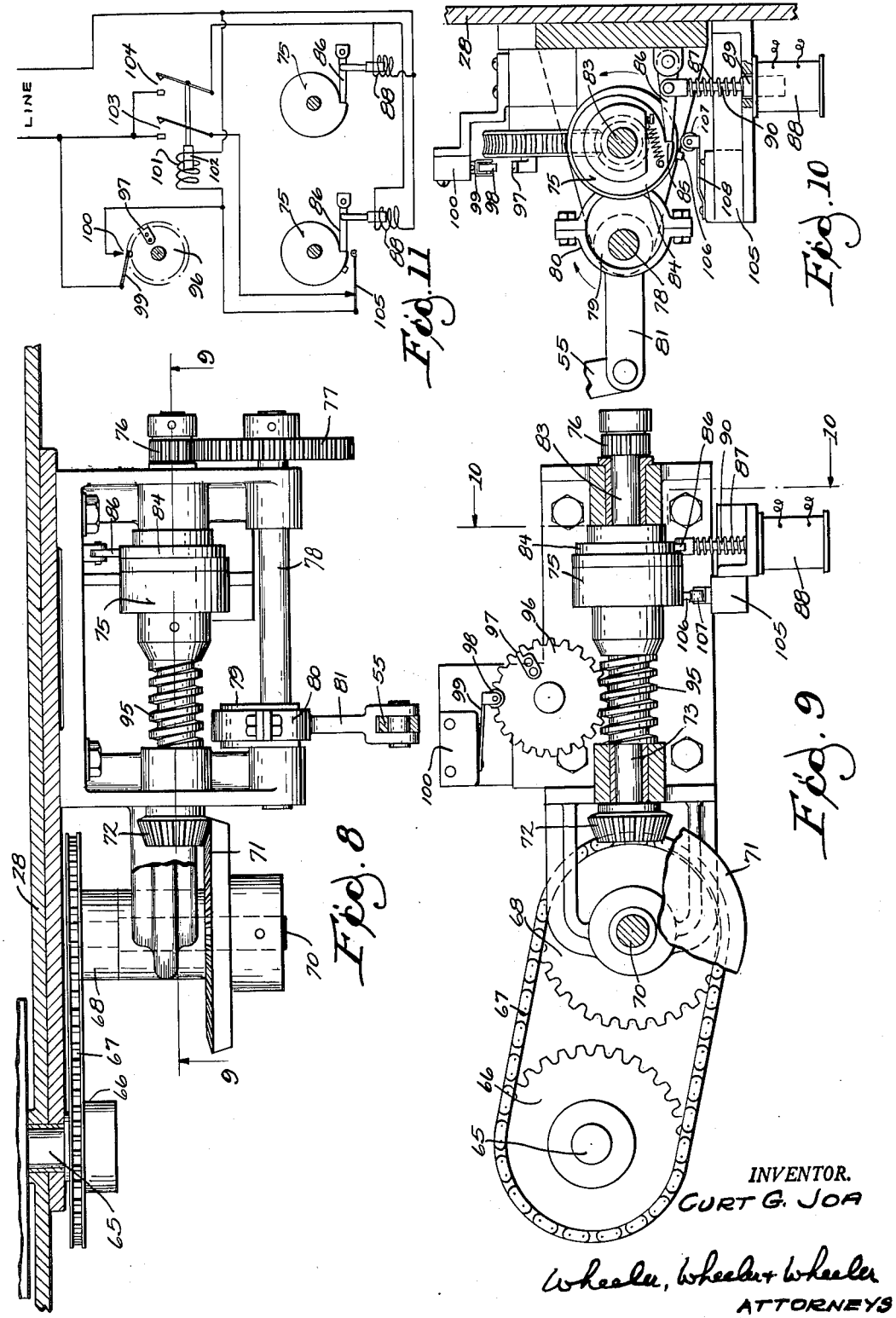

United States Patent Office 2,730,144
Patented Jan. 10, 1956

2,730,144

AUTOMATIC HOPPER FEED FOR A WOOD WORKING MACHINE

Curt G. Joa, Sheboygan Falls, Wis.

Application November 4, 1953, Serial No. 390,111

8 Claims. (Cl. 144—245)

This invention relates to an automatic hopper feed for a wood working machine.

The wood working machine is of a type to which wood boards or panels are fed. The spacing between centers varies according to the width of the work pieces and the propelling chain has lugs which are correspondingly adjustable. Since the number of lugs cannot always be at equal spacing in a chain of fixed dimensions, any surplus is accumulated at a given point on the chain and a clutch in the driving connections is automatically disengaged at the point where excess space is accumulated to interrupt the feed from the hopper until the spacing between lugs is again uniform so that feed can be resumed at a uniform rate from the hopper.

The hopper may comprise adjustable corner guides to receive work pieces of different width and length. Means is provided for supporting the work pieces which are successively next to the bottom of the stack in the hopper by engaging these with prongs at spaced points on their ends pending discharge from beneath the stack of the work piece which is at the bottom. After the bottommost work is discharged onto the conveyor chain for delivery onto the wood working machine, the bottom supports return to position beneath the stack and the prongs temporarily engaging the ends of the next work piece are simultaneously retracted so that the entire stack may be lowered by gravity onto the retractable supports. As a part of the invention the various devices which intermittently operate the temporary supports and the bottom supports for the stack are cross connected for simultaneous operation and means is also provided for the concurrent actuation of corresponding supports at a distance from the supports ordinarily used, the distant supports being effective only upon work pieces of extraordinary width.

In the drawings:

Fig. 1 is a plan view of apparatus embodying the invention.

Fig. 2 is a diagrammatic detail view in side elevation of a feed chain showing its propelling lugs at uniform spacing except where extra space is accumulated at the conclusion of one cycle of chain operation.

Fig. 3 is a view on an enlarged scale taken in section on line 3—3 of Fig. 1.

Fig. 4 is a detail view taken in section on the line 4—4 of Fig. 6.

Fig. 5 is a fragmentary detail view similar to Fig. 3 with portions of a work piece broken away to show the penetration of the prong of one of the temporary supports.

Fig. 6 is an enlarged detail view in plan of the right hand side of the feeder shown on a smaller scale in Fig. 1.

Fig. 7 is a side elevation of the right hand side of the feeder shown in Fig. 1.

Fig. 8 is a plan view of the driving connections at the level indicated at 8—8 in Fig. 7.

Fig. 9 is a view in longitudinal section taken on the line 9—9 of Fig. 8.

Fig. 10 is a view taken in section on the line 10—10 of Fig. 9.

Fig. 11 is a diagrammatic view of the electrical control cricuit used.

Referring to Fig. 1, I have shown at A a wood working machine which may be of any desired type or for any desired purpose. As shown, the machine comprises merely a pair of circular saws at 15, 16 driven by motors 17, 18 between which the work pieces 20 are fed by the lugs 21 of conveyor chain 22 to be trimmed to uniform length. The lugs are adjustable upon the chain in a manner having no relation to the present invention and consequently not shown. The purpose of the adjustment is to keep the wood working machine operating at approximately full capacity by reducing the clearance between work pieces to a pre-determined minimum value, regardless of the width of the work pieces. Assuming that the work pieces are panels perhaps 16 inches in width, or thereabouts, the lugs may be adjusted to a 20 inch spacing throughout most of the length of the chain 22 but, since the chain is not always divisible into equal parts, there is a space of 30 inches between lugs 21a and 21b. The chain may be of the general type disclosed in my Patent No. 2,466,240.

The hopper is disclosed in my Patent No. 2,345,937. It comprises corner angles 23, 24, 25, and 26 which are relatively adjustable. The adjustment with which the present invention is particularly concerned is an adjustment parallel to the path of conveyor chain movement to accommodate work pieces or panels 20 of different width. There is a frame 28 (Fig. 3) which is provided with ways at 29 for the respective conveyor chains 22. Brackets support the outrigger rails from the frame. These rails provide ways upon which are slidably adjustable longitudinally as well as inwardly and outwardly carriages 32 from which the respective hopper corner angles are supported as best shown in Fig. 6 and Fig. 7. For use when the panels 20 are extremely wide an additional carriage 32' is provided to which the corner angles 25 of the hopper may be affixed after removal from carriage 32. Corresponding provision is made for removing corner angle 23 from the carriage 32 at the left hand side of the frame and attaching it to a carriage 32' shown in Fig. 1.

The stack of work pieces 20 confined between the corner angles 23, 24, 25, 26 is normally supported on the shelf plates 33 which project from the ends of transversely reciprocable bars 34 as best shown in Figs. 3 and 5. Each such bar is provided with bearings in standards 35 mounted on carriages 36 as shown in Figs. 3–7. Bearings are provided in the same standards 35 for other reciprocable rods 37 at a higher level. Rods 37 are provided at their forward ends with sets of prongs 38 as best shown in Figs. 3, 5 and 6. These prongs are capable of penetrating into the ends of the work pieces 20 in the manner indicated in Fig. 5. They are of sufficiently small diameter so that their penetration into the end grain leaves substantially no opening when the prongs are withdrawn. Damage to the end grain is immaterial, in any event, in the present structure inasmuch as the ends of the work pieces are trimmed off by the saws 15 and 16.

When the shelf plates 33 support the stack of work pieces 20 in the manner shown in Fig. 3, the prong carrying bars 37 are retracted so that the prongs do not engage the work pieces. In Fig. 3, the lower-most work piece 20a has been lowered onto the conveyor chains 22 in the path of lugs 21 thereof to be propelled from beneath the hopper. In due course, before the next lugs of the conveyor chains approach the hopper, another work piece is dropped from the stack. To accomplish this, the prongs 38 are forced into the end grain of the work piece 20c which is second from the bottom as viewed in Fig. 3. This work piece is thereby supported and provides secure support for the remaining work pieces in the stack. Bars 34 are then retracted to withdraw the shelf plates 33 from beneath the lower most work piece 20b of the stack allowing this to be dropped onto the conveyor chains behind the now advanced work piece 20a. The rods 34 then advance beneath work piece 20c and rods 37 are retracted to withdraw the prongs 38 from work piece 20c, whereupon this work piece and the other work pieces of the stack drop onto the shelf plates 33. The means by which this advancing and retracting movement of the several bars is effected will now be described.

There is a cross connection between each of the reciprocable rods 37 of one pair of rods and the lower rod 34 of the other pair. To this end, I provide a pair of upright posts 39 and 40 upon a carriage 41 mounted on rail 30 between the carriages 36 which carry the respective standards 35. A rocker 42 mounted for oscillation on post 39 has a slotted rocker arm 43 engaged with a pin 44 that projects upwardly from the reciprocable rod 37. The rocker 42 is provided at a lower level with an oppositely projecting arm 45 with an offset portion at 46 slotted to engage pin 47 which projects upwardly from the reciprocable bar 34 of the pair shown at the right in Fig. 4.

Post 40 carries a rocker 50 which has a slotted arm 51 engaged with pin 52 of the right hand reciprocable bar 37 as viewed in Fig. 4 and another arm 53 at a lower level which similarly engages the pin 54 of the lower bar 34 at the left as viewed in Fig. 4. Consequently, it is only necessary to move the bars 37 inwardly and outwardly in order to effect converse or opposite movement of the bars 34. Concurrent operation of bars 37 is effected by the oscillation of a lever 55 fulcrumed at 56 on bracket 57 and pivoted by bolt 58 to a lateral arm 59 upon a cross head 60 connected to the two bars 37 as shown in Figs. 3, 5, 6 and 7. The drive which oscillates lever 55 to reciprocate the bars that function as an escapement to discharge successive work pieces from the hopper may be taken from any desired source but in the present device is taken from the conveyor sprocket shaft 65.

Externally of the frame 28 the shaft 65 of the conveyor sprocket has a separate sprocket 66 at each side of the machine, the arrangement at the right being shown as typical in Figs. 5–10. From sprocket 66, chain 67 drives another sprocket 68 on shaft 70 on which there is a bevel gear 71 meshing with gear 72 on shaft 73. Through a clutch at 75 and pinion 76 and gear 77 motion is transmitted to a shaft 78 which makes one rotation for each work piece, the gears 76 and 77 being change gears whereby the rate of rotation of shaft 78 may be adjusted to the work. Shaft 78 carries an eccentric 79 having a strap 80 connected by link 81 with lever 55 above referred to for the reciprocation of the escapement bars 37, 38, and opposite advance and retraction.

The clutch 75 may be of the type shown in Dickens Patent 2,140,737. Its driven shaft 83, upon which change gear 76 is mounted, is rotated when the single toothed ring 84 is stationary. The single tooth at 85 on the periphery of this ring is normally held stationary by a pawl 86 urged into engagement with the tooth 85 by the bias of compression spring 87. The pawl may be retracted from engagement by solenoid 88, the armature 89 of which is connected by link 90 with the pawl 86 to withdraw the pawl when the solenoid is energized. The solenoid for the pawl which controls the clutch 75 at the left hand side of the machine may be energized and de-energized by the same electrical circuit which controls the clutch at the right hand side of the machine as diagrammatically illustrated in Fig. 11.

A worm 95 on the shaft which carries bevel gear 72 on the driving side of the clutch meshes with the worm gear 96 which is operated at a ratio such as to make one turn for each complete cycle of movement of the conveyor chains 22. Worm gear 96 carries a striker cam 97 which, as the chains approach the point at which discrepancies in pawl spacing are accumulated, engages the cam follower roller 98 on switch actuator 99 to close momentarily the normally open switch 100 thereby completing a circuit through the relay coil 101 to the respective solenoids 88 to retract the pawls 86. The energization of the relay coil 101 and the consequent attraction of its armature 102 closes switch contacts at 103 and 104. Switch 103 controls a holding circuit through normally closed switch 105 to maintain the relay energized and switch 104 closed. However, the very first rotation of the clutch part 75 causes the cam pin 106 to engage the cam follower roller 107 on switch actuator 108 to open the normally closed switch 105 thereby breaking the holding circuit through relay coil 101 and switch 103 to allow the relay to open. Thereupon the pawls 86 are released by the respective electromagnets 88 and urged by their respective springs 87 into re-engagement with the single tooth or shoulder 85 of the clutches to arrest the floating ring of the clutches after a single rotation thereof and thereby to re-engage the clutches for transmission to the escapement feeds which deliver successive work pieces from the hopper.

Accordingly, the arrangement is such that immediately after passage of lugs 21a of the conveyor chains, the escapement mechanisms become re-timed with the conveyor chains so that no matter how great the gap between lugs 21a and 21b, within the range of the apparatus, only one work piece is dropped and this is properly re-synchronized with the conveyor chains to follow thereon at the proper point in advance of the next propelling lugs 21b.

Reference has been made to the fact that the hopper may be so enlarged as to require a separate adjustable bracket at 32'. With work pieces of such width as to require this auxiliary bracket, the pairs of work piece feeders above described will no longer be reasonably centered. Under such circumstances therefore, it is desirable to provide auxiliary escapement feeder means working in synchronism with the reciprocable bars 34 and 37. Accordingly, adjacent the normal position of the auxiliary carriage 32', I provide the carriage 36' carrying an upper bar 37' and lower bar 34' respectively provided with prongs 38' and shelf plate 33'. These are in constant operation with bars 37 and 34, whether or not they are operative upon the work. The lever 55 is pivoted on rock shaft 56 which carries at its remote end a lever arm 55' connected through arm 59' with the upper bar 37'. The lever 51' connected with the top bar 37' is connected by a link 110 with lever 53' which is pivoted at 111 and which has a bifurcated end 112 connected with the pin on the lower bar as best shown in dotted lines in Fig. 6. Thus the prongs and shelf plate of the forward pair of bars operate with the prongs and shelf plates of the two pair of bars which hold work pieces of normal width.

I claim:

1. In a hopper feed for a wood working machine or the like, the combination with a hopper having open ends through which work pieces therein are exposed, of shelf supports having reciprocable carriers mounted for advance and retraction to and from a position for the support of work pieces in the hopper, and a pronged support comprising prongs adapted to be driven into a work piece at a level above the work piece engaged with the shelf support and a carrier for such prongs reciprocable to and from an advanced position of prong engagement, and means for advancing and retracting the respective carriers in alternation whereby the shelf support releases the lower-most work piece in the hopper while successive work pieces are sustained by engagement of said prongs in a work piece above that released, in combination with conveyor means underlying the hopper and having adjustably spaced lugs for work piece advance, said lugs being uniformly spaced throughout the conveyor means except at one point on said conveyor means where the spacing is greater than said uniform spacing, means for reciprocating the said carriers in synchronism with conveyor advance, said means including driving connections having a clutch, and means for momentarily disengaging the clutch when the conveyor portion having lugs at said greater spacing passes beneath the hopper whereby to initiate a new cycle of work piece feeding from said hopper in synchronism with the passage on said conveyor means of lugs at uniform spacing.

2. In a device of the character described the combination with a hopper for a stack of wooden work pieces, said hopper having open ends through which the end grain of the lower most work pieces of the stack is exposed, of at least two pairs of carriers at each end of the hopper, each pair comprising carriers at two levels, the lower carriers in each pair being provided with means engageable with the lower most work piece in the stack for the support of the stack and the uppermost carrier of each pair being provided with prong means engageable in the end grain of a successive work piece of the stack for the temporary support of the stack, and means for the concurrent actuation of the carriers at one level and means for the concurrent operation in an opposite direction of the carriers at the other level for the release of successive work pieces from the bottom of the stack and the temporary support of successive work pieces by impaling them upon said prongs to support the stack while the bottom work piece is being released, the means for actuating the carriers at one level comprising a lever having a cross head connection with the said carriers, the means for actuating the carriers at the other level comprising a pair of rockers each having generally horizontal lever arms connected with the carriers on a vertical pivot, means connecting said arms for actuation by said cross head and another pair of generally horizontal lever arms connected with the carriers on a vertical pivot at the other level, and means connecting the arms of said rockers whereby the carriers of the respective levels are interconnected for simultaneous operation.

3. In a device of the character described the combination with a hopper for a stack of wooden work pieces, said hopper having open ends through which the end grain of the lowermost work pieces of the stack is exposed, of at least two pairs of carriers at each end of the hopper, each pair comprising carriers at two levels, the lower carriers in each pair being provided with means engageable with the lowermost work piece in the stack for the support of the stack and the uppermost carrier of each pair being provided with prong means engageable in the end grain of a successive work piece of the stack for the temporary support of the stack, and means for the concurrent actuation of the carriers at one level, and means for the concurrent operation in an opposite direction of the carriers at the other level for the release of successive work pieces from the bottom of the stack and the temporary support of successive work pieces by impaling them upon said prongs to support the stack while the bottom work piece is being released, the means for actuating the carriers at one level comprising a lever having a cross head connection with the said carriers, the means for actuating the carriers at the other level comprising a pair of rockers each having lever arms pivotally connected with the carriers actuated by said cross head and another pair of arms pivotally connected with the carriers at the other level, whereby the carriers of the respective levels are interconnected for simultaneous operation in combination with driving connections to the lever including an eccentric and eccentric strap connected with the lever and a shaft driving the eccentric and including a clutch, a conveyor movable beneath the hopper to receive successive work pieces discharged therefrom and having spaced lugs and an interval representing the start of a cycle at which there is a gap between lugs which is greater than the spacing aforesaid, a rotor connected with the conveyor to operate in synchronism therewith, and clutch disengaging means including a part carried by the rotor and a driven part engaged by the rotor-carried part.

4. The combination with a feed conveyor having spaced lugs and a gap representing the start of a cycle and of greater width than the lug spacing aforesaid, of a hopper provided with escapement means for delivering successive work pieces onto the conveyor to be propelled by the lugs thereof, and an escapement control comprising a conveyor actuated cam, an escapement drive including a clutch having relatively movable parts, a cam follower having connections for the disengagement of the clutch and means controlled by the movement of one of said clutch parts for effecting re-engagement of the clutch.

5. The device of claim 4 in which the clutch has a control pawl biased in one direction and provided with electromagnetic means for its movement against said bias, the said cam follower including a switch actuator, in combination with a normally open switch connected to be closed by said actuator, circuit means controlled by said switch and including a holding relay and energizing connections controlled by said relay for energizing said electromagnetic means to operate said pawl, the means operated by movement of said clutch part comprising a normally closed switch in circuit with the holding relay and opened in the rotation of the part to break the circuit to said relay and de-energize said electromagnetic means.

6. In a machine tool feed the combination with a feed conveyor, of a work piece hopper comprising adjustable corner members along the path of conveyor movement, guide rails provided with adjustable supports for said corner members, supplementary adjustable supports remote from the supports first mentioned and to which a pair of corner members is removable when the work pieces are of unusual size, escapement mechanisms at opposite sides of the conveyor for supporting work pieces in the hopper and discharging such work pieces successively onto the conveyor, said escapement mechanisms comprising retractable stack supporting means and reciprocable temporary stack supporting means at a higher level, drive connections for the opposite movement of the stack supporting means and the temporary stack supporting means and an auxiliary escapement mechanism adjacent each auxiliary support aforesaid, each auxiliary escapement mechanism comprising stack supporting means and temporary stack supporting means and driving connections for actuating the auxiliary escapement mechanisms concurrently with the escapement mechanisms first mentioned.

7. The device of claim 6 in which one of said supporting means has operating connections including a lever mounted on a rock shaft, the rock shaft extending along the path of conveyor movement and being provided adjacent an auxiliary escapement mechanism with another lever connected to the last mentioned mechanism for its operation.

8. In a device of the character described, the combination with a wood-working machine having a feed conveyor provided with spaced lugs, of a hopper having four guides for the corners of a stack of work pieces to be discharged onto said conveyor for feed into said machine, the ends of said corner guides being spaced to expose the ends of successive work pieces adjacent the bottom of the stack, four shelf supports for sustaining the work pieces of the stack above the level of the conveyor, four carriers upon which said shelf supports are mounted at the same level at opposite sides of the hopper, said carriers being retractable to release the lower-most work piece of the stack supported thereby, four other carriers above the carriers first mentioned and provided with four prongs mounted thereon at the same level and adapted to be received into the end grain of a work piece above the level of the work piece at the bottom of the stack, means mounting the second mentioned carriers for reciprocation, driving connections including means for the reciprocation of the carriers at one level, and rockers in intermediate pivotal connection with the carriers at the said levels and having first horizontal arms at one side of said pivots at the level of one set of carriers and connected thereto and second horizontal arms at the other side of said pivots at the level of the other set of carriers and connected thereto whereby said rockers constitute levers for the transmission of motion from one carrier to another in an opposite direction, the movement of one set of carriers causing pivotal movement of said arms in horizontal planes at different levels.

References Cited in the file of this patent

UNITED STATES PATENTS

| | | |
|---|---|---|
| 730,920 | Joecken | June 16, 1903 |
| 1,649,365 | Poling et al. | Nov. 15, 1927 |
| 2,140,737 | Dickens | Dec. 20, 1938 |
| 2,345,937 | Joa | Apr. 4, 1944 |
| 2,466,240 | Joa | Apr. 5, 1949 |
| 2,558,633 | Tuttle | June 26, 1951 |
| 2,589,600 | Burkholder | Mar. 18, 1952 |